J. J. G. COOPER.
FISHHOOK.
APPLICATION FILED JULY 11, 1919.

1,333,101.

Patented Mar. 9, 1920.

Inventor
James J. G. Cooper

By
Attorney ial No. 310,167.

UNITED STATES PATENT OFFICE.

JAMES J. G. COOPER, OF JACKSONVILLE, FLORIDA.

FISHHOOK.

1,333,101.  Specification of Letters Patent.  Patented Mar. 9, 1920.

Application filed July 11, 1919. Serial No. 310,167.

*To all whom it may concern:*

Be it known that I, JAMES J. G. COOPER, a citizen of the United States, residing at Jacksonville, in the county of Duval and State of Florida, have invented certain new and useful Improvements in Fishhooks, of which the following is a specification.

This invention relates to improvements in fish hooks.

The object of the invention is to provide a hook of this character which may be taken off and replaced on the line with great ease and safety to provide for the changing of a hook without the formation of any knots in the line which are very objectionable in that they cut the line when improperly tied.

Another object is to so construct a fishing hook with means for securing it to a line so that when the line is engaged therewith, all danger of it slipping off the hook is obviated and the greater the pull on the line, the tighter it will engage the hook.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
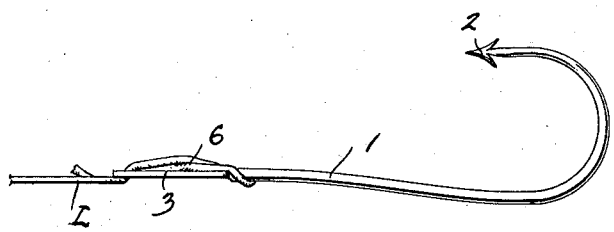
Figure 2:
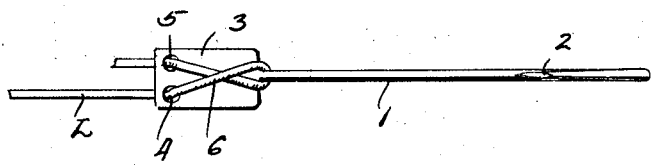
Figure 3:
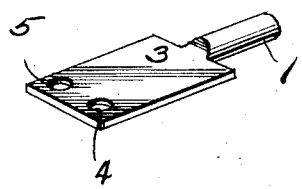

Figure 1 represents a side elevation of a fishing hook constructed in accordance with this invention shown applied, the line being broken off, Fig. 2 is a top plan view thereof, and Fig. 3 is a detail perspective view of the line engaging end of the hook.

In the embodiment illustrated, a fishing hook is shown having the usual shank 1 provided with a barbed point 2 of ordinary construction, the point being shown arranged edge-wise to be in transverse alinement with the shank. (See Fig. 2.)

The inner end of shank 1 is equipped with an attaching plate 3 which is preferably made integral with shank 1, although not necessarily so, as it may be riveted or brazed to the shank. This plate 3 has apertures 4 and 5 arranged in transverse alinement and spaced from each other, being designed for the passage therethrough of the line L.

In connecting the line L to the hook, one end is threaded through aperture 4, then passed around shank 1 adjacent plate 3 and inserted under the line at the point 6 and then passed through aperture 5. The plate 3 being made substantially rectangular, projects on opposite sides of the shank 1 at its junction with the plate and prevents the line from slipping off.

From the above description, it will be seen that the greater the pull exerted on the hook, the tighter will be the pressure on the line at the point 6, the line forming, when inserted in the manner above described, what may be termed a "half hitch."

This apertured plate 3 provides for the safety and easy removal of a hook from the line and its insertion thereon, requiring the formation of no knots such as are necessary when a hook having the ordinary eye is used.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

A fish hook having a shank with a plate at its rear end provided with transversely alined apertures, said plate extending at its inner end on opposite sides of the shank to facilitate the retention of the line in engagement with the hook shank.

In testimony whereof I affix my signature in presence of two witnesses.

JAMES J. G. COOPER.

Witnesses:
CHARLES R. BENTON,
CHARLES M. COOPER.